UNITED STATES PATENT OFFICE 2,587,661

BENZOPHENOTHIAZINE NITRILES

Nathan L. Smith, Indian Head, Md.

No Drawing. Application October 30, 1950,
Serial No. 193,016

3 Claims. (Cl. 260—243)

(Granted under the act of March 3, 1883, as
amended April 30, 1928; 370 O. G. 757)

This invention relates to new compounds of the benzophenothiazine series.

The new compounds of the invention are β-(12-benzo[a]phenothiazine-propionitrile and β-(7-benzol[c]phenothiazine-propionitrile. They have the general formula:

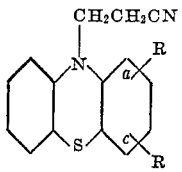

wherein one of the radicals R is the residue of a fused benzene ring or benzo group and the other is hydrogen. The nomenclature here used is that according to Chemical Abstracts wherein the $a$ and the $c$ fused positions correspond, respectively, to the N-1,2 and N-3,4 fused positions following the nomenclature according to Beilstein.

The new compounds are antioxidants for substances such as gasoline and petroleum lubricants. The presence of the benzo group enhances the solubilities of the phenothiazine molecule in liquid hydrocarbons. They are valuable intermediates for organic synthesis and in particular for the production of the carboxylic acid derivative and amides and amines.

The preparation of the new mononitriles can be carried out by reaction between acrylonitrile and, respectively, 12 - benzo[a]phenothiazine(thiophenyl-α-naphthylamine) and 7-benzo[c]phenothiazine(thiophenyl-β-naphthylamine) in the presence of a small amount of Triton B (aqueous solution of benzyltrimethylammonium hydroxide) which acts to catalyze the addition reaction.

The following specific example illustrates the preparation of the new compounds. Parts are in the metric system and are by weight unless otherwise indicated.

Example

To a mixture of 10 parts acrylonitrile and 25 parts 7-benzo[c]phenothiazine was added 0.5 ml. Triton B (40% aqueous solution). The reaction proceeds at room temperature and was completed by heating on a steam bath for 1 hour. The product was taken up in glacial acetic acid and precipitated therefrom as yellow crystals (M. P. 215° C.) by the addition of water.

The invention described herein may be manufactured and used by or for the Government of the United States of America for Governmental purposes without the payment of any royalties thereon or therefor.

What is claimed is:

1. A benzophenothiazine mono-propionitrile of the general formula:

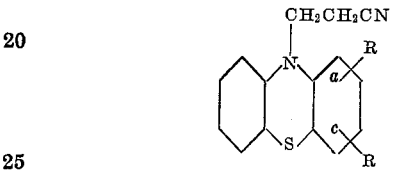

wherein one of the radicals R is hydrogen and the other is the benzo group in one of the fused positions $a$ and $c$.

2. As a new compound, β-(12-benzo[a]phenothiazine)propionitrile.

3. As a new compound, β-(7-benzo[c]phenothiazine)propionitrile.

NATHAN L. SMITH.

REFERENCES CITED

The following references are of record in the file of this patent:

UNITED STATES PATENTS

| Number | Name | Date |
|---|---|---|
| 2,217,566 | Smith | Oct. 8, 1940 |